United States Patent
Dennis et al.

(10) Patent No.: US 10,908,950 B1
(45) Date of Patent: Feb. 2, 2021

(54) ROBOTIC PROCESS AUTOMATION SYSTEM WITH QUEUE ORCHESTRATION AND TASK PRIORITIZATION

(71) Applicant: Automation Anywhere Inc., San Jose, CA (US)

(72) Inventors: James Dennis, San Jose, CA (US); V J Anand, San Ramon, CA (US); Abhijit Kakhandiki, San Jose, CA (US)

(73) Assignee: Automation Anywhere, Inc., San Jose, CA (US)

( * ) Notice: Subject to any disclaimer, the term of this patent is extended or adjusted under 35 U.S.C. 154(b) by 117 days.

(21) Appl. No.: 16/146,485

(22) Filed: Sep. 28, 2018

Related U.S. Application Data

(63) Continuation-in-part of application No. 16/024,796, filed on Jun. 30, 2018, and a continuation-in-part of application No. 15/957,915, filed on Apr. 20, 2018.

(51) Int. Cl.
*G06F 9/46* (2006.01)
*G06F 9/48* (2006.01)

(52) U.S. Cl.
CPC ................... *G06F 9/4881* (2013.01)

(58) Field of Classification Search
CPC ........................................................ G06F 9/4881
See application file for complete search history.

(56) References Cited

U.S. PATENT DOCUMENTS

| | | | |
|---|---|---|---|
| 4,980,820 A * | 12/1990 | Youngblood | G06F 13/26 710/48 |
| 5,949,999 A | 9/1999 | Song et al. | |
| 5,983,001 A | 11/1999 | Boughner et al. | |
| 6,133,917 A | 10/2000 | Feigner et al. | |
| 6,389,592 B1 | 5/2002 | Ayres et al. | |
| 6,427,234 B1 | 7/2002 | Chambers et al. | |
| 6,463,346 B1 * | 10/2002 | Flockhart | G06Q 10/10 379/266.01 |
| 6,473,794 B1 | 10/2002 | Guheen et al. | |
| 6,496,979 B1 | 12/2002 | Chen et al. | |
| 6,584,529 B1 * | 6/2003 | Thomas | G06F 13/16 370/429 |
| 6,640,244 B1 | 10/2003 | Bowman-Amuah | |
| 6,704,873 B1 | 3/2004 | Underwood | |
| 6,871,011 B1 | 3/2005 | Rahman et al. | |

(Continued)

OTHER PUBLICATIONS

B. P. Kasper "Remote: A Means of Remotely Controlling and Storing Data from a HAL Quadrupole Gas Analyzer Using an IBM-PC Compatible Computer", Nov. 15, 1995, Space and Environment Technology Center.

(Continued)

*Primary Examiner* — Adam Lee
(74) *Attorney, Agent, or Firm* — Appleton Luff

(57) ABSTRACT

A robotic process automation (RPA) system receives task prioritization inputs that specify prioritization for processing of a set of RPA tasks. The tasks are performed in accordance with the specified priorities. The RPA system also receives queue orchestration commands that specify conditions under which tasks processed from a first queue are sent to another queue for subsequent processing. The RPA system also provides service level automation in accordance with specified parameters. Further task prioritization may be specified to provide quality of service performance.

22 Claims, 12 Drawing Sheets

(56) References Cited

U.S. PATENT DOCUMENTS

| | | |
|---|---|---|
| 6,898,764 B2 | 5/2005 | Kemp |
| 7,091,898 B2 | 8/2006 | Arling et al. |
| 7,246,128 B2 | 7/2007 | Jordahl |
| 7,337,248 B1 | 2/2008 | Rao et al. |
| 7,441,007 B1 | 10/2008 | Kirkpatrick et al. |
| 7,533,096 B2 | 5/2009 | Rice et al. |
| 7,568,109 B2 | 7/2009 | Powell et al. |
| 7,765,525 B1 | 7/2010 | Davidson et al. |
| 7,805,317 B2 | 9/2010 | Khan et al. |
| 7,805,710 B2 | 9/2010 | North |
| 7,810,070 B2 | 10/2010 | Nasuti et al. |
| 7,846,023 B2 | 12/2010 | Evans et al. |
| 8,028,269 B2 | 9/2011 | Bhatia et al. |
| 8,056,092 B2 | 11/2011 | Allen et al. |
| 8,095,910 B2 | 1/2012 | Nathan et al. |
| 8,132,156 B2 | 3/2012 | Malcolm |
| 8,169,916 B1* | 5/2012 | Pai .................... H04N 21/2181 370/236 |
| 8,234,622 B2 | 7/2012 | Meijer et al. |
| 8,438,558 B1 | 5/2013 | Adams |
| 8,443,291 B2 | 5/2013 | Ku et al. |
| 8,464,240 B2 | 6/2013 | Fritsch et al. |
| 8,498,473 B2 | 7/2013 | Chong et al. |
| 8,504,803 B2 | 8/2013 | Shukla |
| 8,612,522 B1* | 12/2013 | Sylvain ................ H04L 67/306 370/352 |
| 8,682,083 B2 | 3/2014 | Kumar et al. |
| 8,769,482 B2 | 7/2014 | Batey et al. |
| 8,965,905 B2 | 2/2015 | Ashmore et al. |
| 9,213,625 B1 | 12/2015 | Schrage |
| 9,278,284 B2 | 3/2016 | Ruppert et al. |
| 9,357,069 B2* | 5/2016 | Ristock ................... H04M 3/51 |
| 9,444,844 B2 | 9/2016 | Edery et al. |
| 9,462,042 B2 | 10/2016 | Shukla et al. |
| 9,667,702 B1 | 5/2017 | Wright et al. |
| 9,930,376 B2* | 3/2018 | Pikes ............... H04N 21/23418 |
| 9,942,211 B1 | 4/2018 | Campagna |
| 10,380,074 B1 | 8/2019 | Gu et al. |
| 2002/0099669 A1 | 7/2002 | Lauer |
| 2003/0033590 A1 | 2/2003 | Leherbauer |
| 2003/0101245 A1 | 5/2003 | Srinivasan et al. |
| 2003/0152212 A1* | 8/2003 | Burok ................. G06Q 10/06 379/265.02 |
| 2003/0159089 A1 | 8/2003 | DiJoseph |
| 2004/0083472 A1 | 4/2004 | Rao et al. |
| 2004/0103208 A1* | 5/2004 | Chung ................ H04L 67/2819 709/236 |
| 2004/0133724 A1 | 7/2004 | Chae |
| 2004/0172526 A1 | 9/2004 | Tann et al. |
| 2004/0177225 A1* | 9/2004 | Furtek ................ G06F 13/1657 711/149 |
| 2004/0210885 A1 | 10/2004 | Wang et al. |
| 2004/0221290 A1* | 11/2004 | Casey .................... G06F 9/50 718/104 |
| 2004/0243994 A1 | 12/2004 | Nasu |
| 2005/0071241 A1* | 3/2005 | Flockhart ........... G06Q 30/0601 705/26.1 |
| 2005/0149749 A1* | 7/2005 | Van Brabant ......... G06F 21/564 726/24 |
| 2005/0188357 A1 | 8/2005 | Derks et al. |
| 2005/0204343 A1 | 9/2005 | Kisamore et al. |
| 2005/0257214 A1 | 11/2005 | Moshir et al. |
| 2006/0059253 A1 | 3/2006 | Goodman et al. |
| 2006/0064383 A1* | 3/2006 | Marking ............. G06Q 20/3829 705/57 |
| 2006/0095276 A1 | 5/2006 | Axelrod et al. |
| 2006/0150188 A1 | 7/2006 | Roman et al. |
| 2006/0294045 A1 | 12/2006 | Suggs et al. |
| 2007/0101291 A1 | 5/2007 | Forstall et al. |
| 2007/0112574 A1 | 5/2007 | Greene |
| 2007/0133435 A1* | 6/2007 | Eneroth ................ H04W 4/10 370/260 |
| 2007/0142936 A1* | 6/2007 | Denison ............... G05B 13/048 700/29 |
| 2007/0201502 A1* | 8/2007 | Abramson ............. H04L 67/32 370/429 |
| 2008/0005086 A1 | 1/2008 | Moore |
| 2008/0028392 A1 | 1/2008 | Chen et al. |
| 2008/0062863 A1 | 3/2008 | Ginde |
| 2008/0071651 A1* | 3/2008 | Markel .................... G06F 8/00 705/30 |
| 2008/0165701 A1* | 7/2008 | Ananthanarayanan ...................... G06Q 30/06 370/254 |
| 2008/0209392 A1 | 8/2008 | Able et al. |
| 2008/0222454 A1 | 9/2008 | Kelso |
| 2008/0263024 A1 | 10/2008 | Landschaft et al. |
| 2009/0037509 A1 | 2/2009 | Parekh et al. |
| 2009/0103769 A1 | 4/2009 | Milov et al. |
| 2009/0172814 A1 | 7/2009 | Khosravi et al. |
| 2009/0199160 A1 | 8/2009 | Vaitheeswaran et al. |
| 2009/0217309 A1 | 8/2009 | Grechanik et al. |
| 2009/0248693 A1* | 10/2009 | Sagar ..................... G06F 16/00 |
| 2009/0249297 A1 | 10/2009 | Doshi et al. |
| 2009/0307160 A1 | 12/2009 | Minh et al. |
| 2009/0313229 A1 | 12/2009 | Fellenstein et al. |
| 2009/0319608 A1* | 12/2009 | Anil ..................... G06Q 10/06 709/204 |
| 2009/0320002 A1 | 12/2009 | Peri-Glass et al. |
| 2010/0023602 A1 | 1/2010 | Martone |
| 2010/0023933 A1 | 1/2010 | Bryant et al. |
| 2010/0061448 A1* | 3/2010 | Zhou ................... H04L 65/602 375/240.03 |
| 2010/0100605 A1 | 4/2010 | Allen et al. |
| 2010/0107170 A1* | 4/2010 | Stehley ................ G06F 9/5038 718/103 |
| 2010/0135296 A1* | 6/2010 | Hwang ................ H04L 12/1836 370/390 |
| 2010/0235433 A1 | 9/2010 | Ansari et al. |
| 2010/0306005 A1* | 12/2010 | Yengulalp ............ G06Q 10/06 705/7.27 |
| 2011/0022578 A1 | 1/2011 | Fotev |
| 2011/0071841 A1* | 3/2011 | Fomenko ................ G06F 21/10 705/1.1 |
| 2011/0099261 A1 | 4/2011 | Joshi |
| 2011/0145807 A1 | 6/2011 | Molinie et al. |
| 2011/0161943 A1* | 6/2011 | Bellows ................ G06F 9/4843 717/149 |
| 2011/0161976 A1* | 6/2011 | Alexander ............ G06F 9/5066 718/104 |
| 2011/0194684 A1* | 8/2011 | Ristock ................... H04M 3/51 379/265.02 |
| 2011/0197121 A1 | 8/2011 | Kletter |
| 2011/0276568 A1 | 11/2011 | Fotev |
| 2011/0276946 A1 | 11/2011 | Pletter |
| 2011/0296528 A1 | 12/2011 | Shukla |
| 2011/0302570 A1 | 12/2011 | Kurimilla et al. |
| 2012/0011515 A1 | 1/2012 | Jolfaei et al. |
| 2012/0042281 A1 | 2/2012 | Green |
| 2012/0124062 A1 | 5/2012 | Macbeth et al. |
| 2012/0158990 A1 | 6/2012 | Losio et al. |
| 2012/0330940 A1 | 12/2012 | Caire et al. |
| 2013/0007753 A1 | 1/2013 | Jain |
| 2013/0085744 A1* | 4/2013 | Arias ..................... G06F 40/58 704/3 |
| 2013/0111470 A1 | 5/2013 | Bozek et al. |
| 2013/0173648 A1 | 7/2013 | Tan et al. |
| 2013/0179895 A1 | 7/2013 | Calder et al. |
| 2013/0254318 A1* | 9/2013 | Colar ..................... H04L 51/22 709/206 |
| 2013/0290318 A1 | 10/2013 | Shapira et al. |
| 2014/0101556 A1* | 4/2014 | Pinard ................... G06Q 10/06 715/734 |
| 2014/0164554 A1 | 6/2014 | Joshi et al. |
| 2014/0181705 A1 | 6/2014 | Hey et al. |
| 2014/0229582 A1* | 8/2014 | Liu ..................... G06F 16/152 709/219 |
| 2014/0237614 A1* | 8/2014 | Irvine .................. G06F 21/6218 726/26 |
| 2014/0365258 A1* | 12/2014 | Vestal ............... G06Q 10/063114 705/7.15 |

(56) References Cited

U.S. PATENT DOCUMENTS

| | | | |
|---|---|---|---|
| 2015/0006895 A1* | 1/2015 | Irvine | G06F 21/6254 |
| | | | 713/171 |
| 2015/0043726 A1* | 2/2015 | Steiner | H04M 3/5233 |
| | | | 379/265.12 |
| 2015/0082280 A1 | 3/2015 | Betak et al. | |
| 2015/0120812 A1* | 4/2015 | Bobykin | H04L 67/02 |
| | | | 709/203 |
| 2015/0135183 A1 | 5/2015 | Kipp | |
| 2015/0294258 A1 | 10/2015 | Hildebrand et al. | |
| 2015/0347186 A1* | 12/2015 | Truong | G06F 9/4881 |
| | | | 718/103 |
| 2015/0347284 A1 | 12/2015 | Hey et al. | |
| 2016/0019049 A1 | 1/2016 | Kakhandiki et al. | |
| 2016/0078368 A1 | 3/2016 | Kakhandiki et al. | |
| 2016/0162331 A1* | 6/2016 | Geng | G06F 9/5027 |
| | | | 718/103 |
| 2016/0170801 A1 | 6/2016 | Balsamo et al. | |
| 2016/0226955 A1 | 8/2016 | Moorthi et al. | |
| 2016/0246655 A1 | 8/2016 | Kimmel et al. | |
| 2016/0292011 A1 | 10/2016 | Colson et al. | |
| 2016/0301766 A1* | 10/2016 | Ionescu | H04L 67/1097 |
| 2016/0307127 A1 | 10/2016 | Katz et al. | |
| 2016/0316022 A1 | 10/2016 | Takano et al. | |
| 2016/0335069 A1 | 11/2016 | Dehmann et al. | |
| 2017/0005940 A1 | 1/2017 | Haegdorens et al. | |
| 2017/0060108 A1 | 3/2017 | Kakhandiki et al. | |
| 2017/0134463 A1 | 5/2017 | Kim | |
| 2017/0235504 A1* | 8/2017 | Susarla | G06F 3/0619 |
| | | | 711/148 |
| 2018/0109587 A1 | 4/2018 | Spilka et al. | |
| 2018/0191814 A1 | 7/2018 | Kinarti et al. | |
| 2018/0197123 A1 | 7/2018 | Parimelazhagan et al. | |
| 2018/0285294 A1 | 10/2018 | Reddy | |
| 2018/0359301 A1* | 12/2018 | Zhao | H04L 67/02 |
| 2019/0313422 A1* | 10/2019 | Pattan | H04L 47/2433 |

OTHER PUBLICATIONS

Bergen et al., RPC automation: making legacy code relevant, May 2013, 6 pages.

Hu et al., Automating GUI testing for Android applications, May 2011, 7 pages.

Tom Yeh, Tsung-Hsiang Chang, and Robert C. Miller, Sikuli: Using GUI Screenshots for Search and Automation, Oct. 4-7, 2009, 10 pages.

Zhifang et al., Test automation on mobile device, May 2010, 7 pages.

* cited by examiner

Control Room ? pmmohan

Workload > Queues > Create queue     Cancel | Create Queue

Create Queue

| GENERAL | ▲ |
| OWNERS | ▲ |
| PARTICIPANTS | ▲ |
| WORK ITEM STRUCTURE | ▷ |
| ADD WORK ITEMS | ▲ |

229

Column names and sorting

Queue category: Mortgage Data Template ← 220

Step 1: Which columns should we include in each work item?

| COLUMN NAME ← 232 | DATA TYPE | COLUMNS TO DISPLAY    230 |
|---|---|---|
| Name | Text | |
| SSN | Text | |
| Loan Amount | Number | X ← 236 |
| FICO Score | Number | X |
| LTV | Number | X |
| Submission Date | Date | X |

Step 2: Sort your data by up to 3 selected columns (optional)

Select column to sort

| Submission Date | Ascending | x Descending |
| Loan Amount | Ascending | x Descending ← 238 |
| LTV | x Ascending | Descending |

< Back | Next >

FIG. 2D

Insert a new work item into a queue with values that you provide

Insert work item into queue: [Approved Loans] ← 242     _240_

Type in values ← 244
                  246

| Name | Data Type | Value |
|---|---|---|
| Name | Text | $WorkItem(Name)$ |
| Loan Amount | Number | $WorkItem(Loan Amount)$  ← 248 |
| FICO Score | Number | $WorkItem(FICO Score)$  ← 249 |
| LTV | Number | $WorkItem(LTV)$ |
| SSN | Text | $WorkItem(SSN)$ |
| Submission Date | Date | $WorkItem(Submission Date)$ |
| Approved By | Text | $WorkItem(Approved By)$ |

[Save] [Cancel]

FIG. 2E

ROBOTIC PROCESS AUTOMATION SYSTEM WITH QUEUE ORCHESTRATION AND TASK PRIORITIZATION

RELATED APPLICATIONS

This application claims priority to and is a continuation-in-part of the following pending patent applications which are assigned to the assignee of the present application:

ROBOTIC PROCESS AUTOMATION SYSTEM WITH SERVICE LEVEL AGREEMENT BASED AUTOMATION, filed in the U.S. Patent Office on Apr. 20, 2018, and assigned application Ser. No. 15/957,915; and ROBOTIC PROCESS AUTOMATION SYSTEM WITH QUALITY OF SERVICE BASED AUTOMATION, filed in the U.S. Patent Office on Jun. 30, 2018, and assigned application Ser. No. 16/024,796.

FIELD OF THE DISCLOSURE

This disclosure relates generally to the field of data processing systems and more particularly to robotic process automation systems.

BACKGROUND

Robotic process automation (RPA) is the application of technology that allows workers in an organization to configure a computer software robot, "robot" or "bot", to capture and interpret existing applications for processing a transaction, manipulating data, triggering responses and communicating with other digital systems. Conventional RPA systems employ software robots to interpret the user interface of third-party applications and to execute steps identically to a human user. Increasingly, RPA systems are being used to process ever larger sets of data, and as dependence on such systems grows, the need increases for such systems to process data within certain time constraints to meet business needs. Moreover, such systems can employ a large number of devices (virtual or physical) to process the data via automation. As the volume and variety of data grows and the availability of computing devices increases it becomes increasingly difficult to manage workloads and devices to meet business needs. This problem becomes particularly acute as reliance on such systems increase. Accordingly, there is a need for improved automation and management of RPA systems in a manner that meets expectations and provides reliable and predictable processing and response times.

SUMMARY

Computerized RPA methods and systems with task prioritization and queue orchestration are disclosed herein. Additionally, the disclosed system may also provide Service Level Agreement (SLA) automation and Quality of Service (QoS) based automation. In a certain aspect, a robotic process automation system includes data storage for storing a plurality of sets of task processing instructions where each set of task processing instructions is operable to interact at a user level with one or more designated user level application programs. The data storage also includes a plurality of sets of work items where each set of work items is stored for subsequent processing by devices executing a corresponding set of task processing instructions. Each set of the work items is characterized by a schema comprising a plurality of attributes. Moreover, each work item within a set of work items contains a value for each attribute in the corresponding schema for the set of work items. A processor is operatively coupled to the data storage and configured to execute instructions that when executed cause the processor to: respond to one or more user inputs to create a queue for processing a set of work items, respond to one or more user inputs to assign one or more of the work items to the queue, respond to one or more user inputs to identify as a prioritization attribute an attribute within a schema for the set of work items and respond to one or more user inputs to prioritize processing of work items in the queue having a value of the prioritization attribute corresponding to a user defined prioritization value or prioritization range. The processor processes the work items in the queue by executing a corresponding set of the task processing instructions to automatically process each work item in the queue with a priority corresponding to values of the prioritization attributes.

In another aspect, a robotic process automation system comprises data storage for storing a plurality of sets of task processing instructions where each set of task processing instructions is operable to interact at a user level with one or more designated user level application programs. The data storage also includes a plurality of sets of work items where each set of work items is stored for subsequent processing by devices executing a corresponding set of task processing instructions. A processor is operatively coupled to the data storage and is configured to execute instructions that when executed cause the processor to: process work items in a first queue containing a first set of items by executing a corresponding first set of the task processing instructions to automatically process each work item in the first queue, to create a first set of processed work items; determine for each work item in the first set of processed work items if one or more variable values meet a predetermined test, and if so then assigning that work item to a second queue for automatic processing by a second set of the task processing instructions to automatically process each work item in the second queue, to create a second set of processed work items.

In certain embodiments, such systems and methods process a set of robotic process automation tasks by receiving service level requirement inputs—number of transactions (work items) to be performed within a specified period of time. Each RPA task includes a set of instructions that cause a computing resource to interact with one or more user level computer applications to perform tasks provided by the one or more user level computer applications. In response to the service level requirement inputs, a number of computing resources (bot runners) required to perform the transactions by an RPA task in the specified period of time is computed. An allocated set of computing resources is generated by determining availability of computing resources from a set of computing resources. The allocated set of computing resources is manually or automatically provisioned and deployed. The status of each computing resource and automation is monitored and each computing resource is redeployed with additional work items as it completes processing a work item in its queue. This permits transparency and the ability to execute automatically within SLA bounds especially at high load volumes. Users may manually prioritize high value transactions within an automated queue management system. A built-in SLA calculator and manually or automated deployment of computing devices enables hundreds or even thousands of computing devices to come into existence to meet increased automation demand the moment it is needed. All of these features empower an enterprise to achieve the best optimization of its digital and human resources to meet highly dynamic SLA demands.

Certain other embodiments alternatively or in addition to the foregoing embodiments, provide QoS based automation by prioritizing user requests over device requests, and prioritizing certain device requests over other device requests. In addition, certain user requests may be prioritized over other user requests. The prioritization of certain requests over others helps to ensure predictable response times and ensures timely processing of priority tasks.

Additional aspects related to the invention will be set forth in part in the description which follows, and in part will be apparent to those skilled in the art from the description or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive techniques disclosed herein. Specifically:

FIG. 2D illustrates a computerized interface for prioritization of tasks.

FIG. 2E illustrates a computerized interface for queue orchestration.

DETAILED DESCRIPTION

Figure 1:
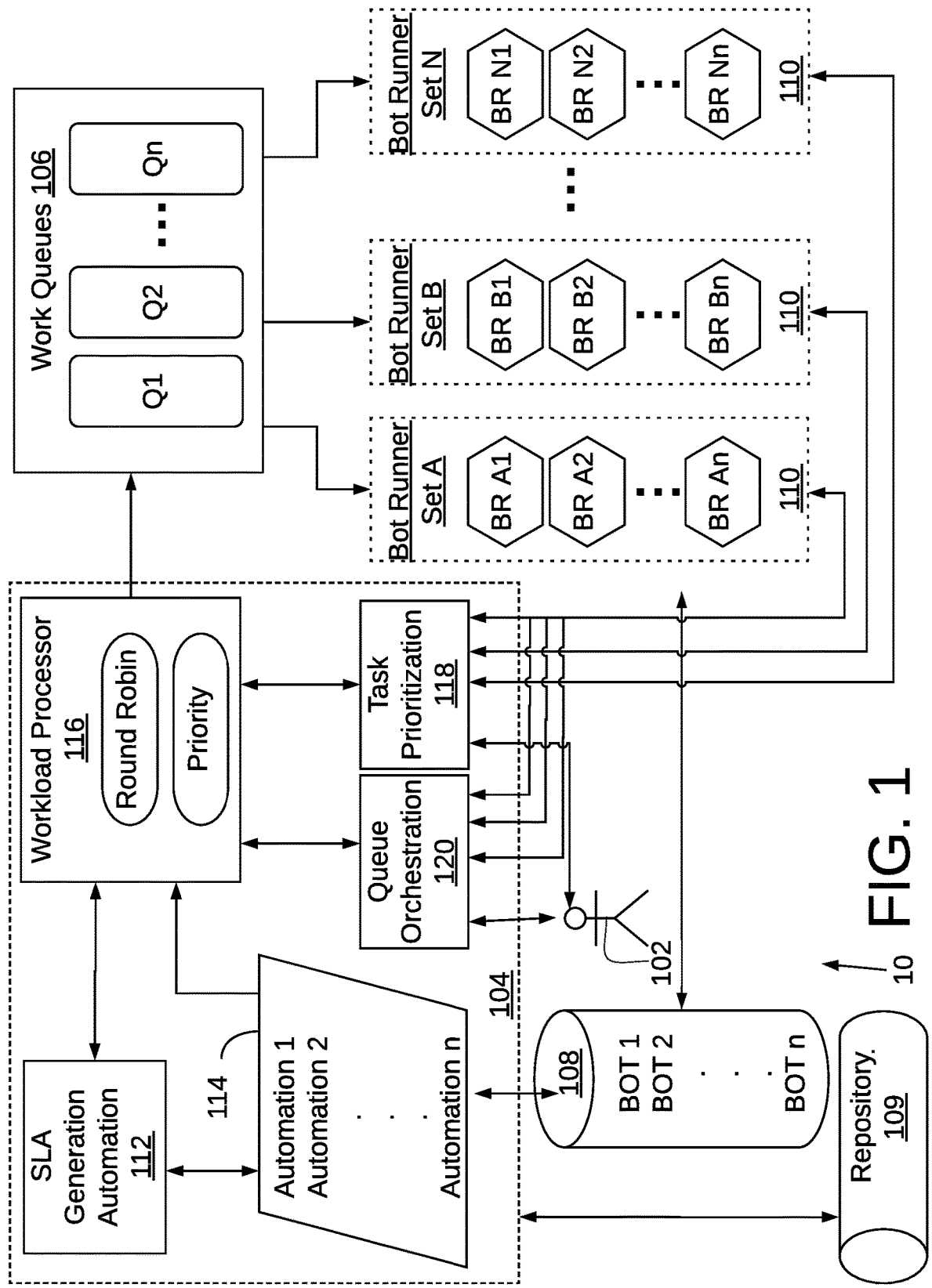
FIG. 1 is a high-level block diagram of an embodiment of an RPA system with Service Level Agreement (SLA) automation.

In the following detailed description, reference will be made to the accompanying drawings, in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense.

Users of RPA systems are increasingly relying on such systems for implementing key business processes. Any given organization will have a finite, generally limited, number of automation resources, such as physical or virtual computing devices, and such automation resources will need to be allocated against an increasing number of automation tasks in a manner that achieves service level agreements with various groups within the organization. For example, an organization may have a number of different types of tasks (task types) such as invoice processing, new hire on-boarding, and travel expense reporting. Each of these task types may at any given time consist of thousands or more tasks that need to be processed. As used herein, the processing of such tasks is performed by a "bot runner" which is a software implemented player for executing a bot (shorthand for "robot") which is a series of instructions for performing an application level task. A bot runner is created by way of a bot creator which creates the series of instructions executed by the bot runner.

In any given organization, there may be thousands of invoices, dozens or more new hires and thousands of expense reports at any one time that require processing, and such tasks need to be processed within an agreed upon time, which is commonly referred to as a service level. The tasks will typically have different priorities in the organization for processing turnaround. For example, certain tasks may need to be rapidly performed, within the course of a day, while others may be able to be performed at a slower, or lower priority pace. Moreover, certain tasks, once performed, may lead to further downstream tasks based on the outcome. For example, in loan processing, if information obtained in initial processing of a loan application leads to a determination of a credit score above a threshold, then that application may need to be moved to a downstream task for processing approved applications.

Determining the number of automation resources to allocate for each task type can also be difficult and time consuming, particularly as the number of task types and volume of the task types increases. Also, there can be significant variation among task types in terms of the amount of time required to process each task. Moreover, deployment of tasks can be a manual and time-consuming process.

Embodiments disclosed herein address many of the aforementioned challenges by providing for prioritization of designated tasks and by providing for queue orchestration to permit automated movement of a processed task to subsequent processing.

Embodiments disclosed herein further permit smart load distribution through intelligent queue management. This permits transparency and the ability to execute automatically within SLA bounds especially at high load volumes. Users may manually prioritize high value transactions within an automated queue management system. A built-in SLA calculator and automated deployment of bot runners enables hundreds or even thousands of bots to be spun up to meet increased automation demand the moment it is needed. In addition, prioritization of certain requests over others helps to ensure predictable response times. All of these features empower an enterprise to achieve the best optimization of its digital and human resources to meet highly dynamic SLA and QoS demands.

FIG. 1 is a high-level block diagram of an embodiment of an RPA system 10 with queue orchestration, task prioritization and service level automation. An authorized user 102 interacts with the RPA system 10 by way of control room module 104 which operates to control processing of tasks within work queues 106. Examples of such task types, as noted above are invoices, new hire onboarding documents and expense reports. These are simple examples and many other task types may be processed with RPA system 10. Each work queue 106 (Q1, Q2, . . . , Qn) preferably includes a set of data (work item) that maps to a specific data type. For example, Q1 may contain invoices, Q2 may contain new hire onboarding documents, etc. The records in each queue 106 are processed by a bot in one or more bot runners stored in storage 108. Data such as documents to be processed by the bot runners are stored in repository 109. The storage 108 and repository 109 are shown separately for simplicity of explanation. The bots in storage 108 and data in repository 109 may be stored in the same storage mechanism or may be distributed across one or more storage mechanisms.

The tasks are processed by bot runners executing on computing devices 110 which may be organized in a variety of logical or physical groups, such as shown in FIG. 1, as Bot Runner Set A, Bot Runner Set B, . . . , Bot Runner Set N. The computing devices 110 may each be physical computing devices, such as a networked desktop computer, or may be virtual devices, such as one or more virtual machine (s) operating on a physical computing device. Results, such as processed tasks, from the processing performed by the computing devices 110 are stored to storage such as storage 108. The computing devices 110 are referred to herein occasionally as bot runner(s) and such a reference is a shorthand to refer to computing device 110 executing instructions to cause a bot runner to perform its functions.

Each bot runner takes the form of a player that executes, via a computing device, a bot to perform the functions encoded by the bot. Additional aspects of operation of bots may be found in the following pending patent application, which refers to bots as automation profiles, System and Method for Compliance Based Automation, filed in the U.S. Patent Office on Jan. 6, 2016, and assigned application Ser. No. 14/988,877, which is hereby incorporated by reference.

Figure 2A:
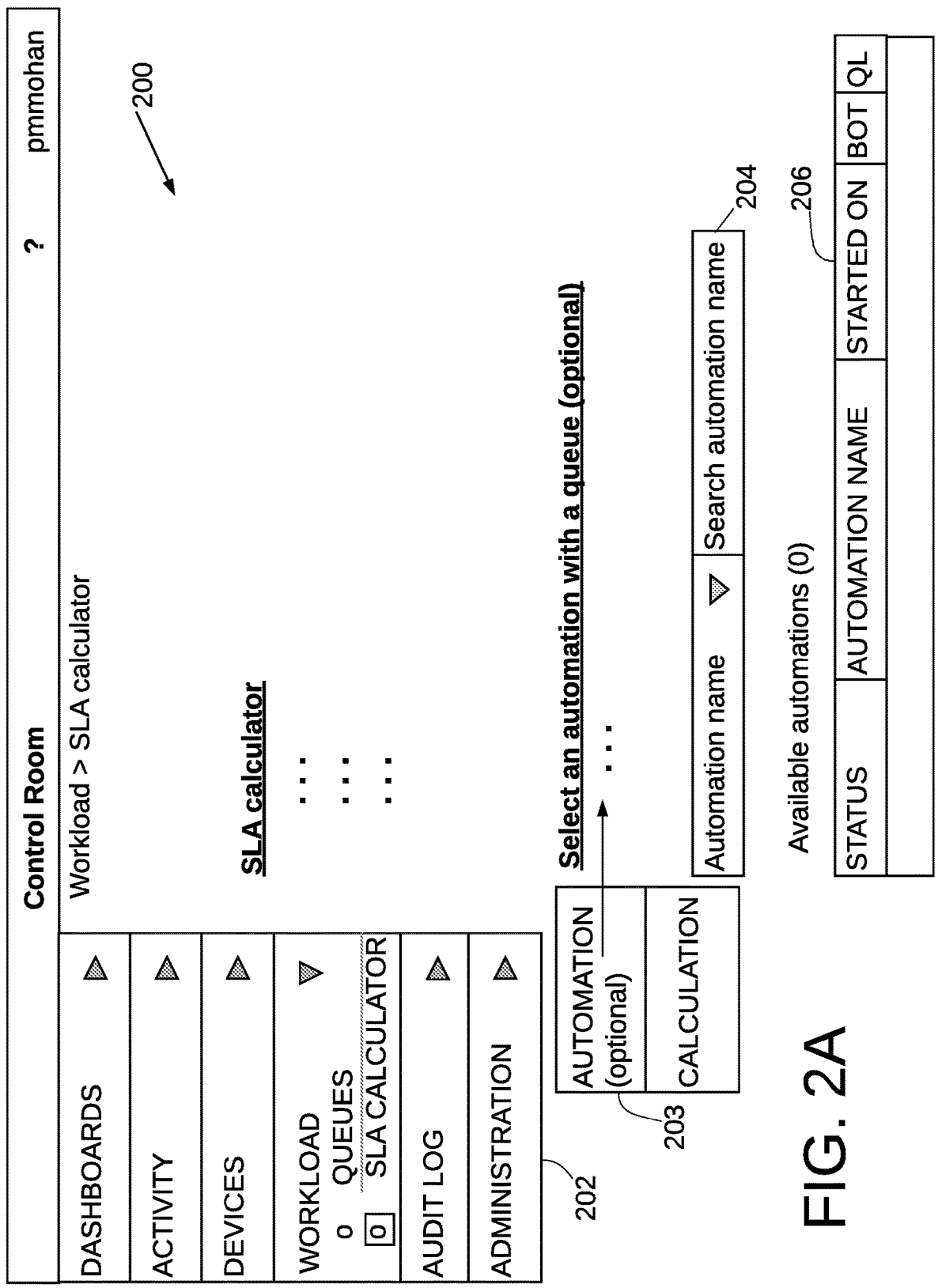
FIGS. 2A, 2B and 2C illustrate a computerized interface for entering and determining service levels for an RPA system.
Figure 2B:
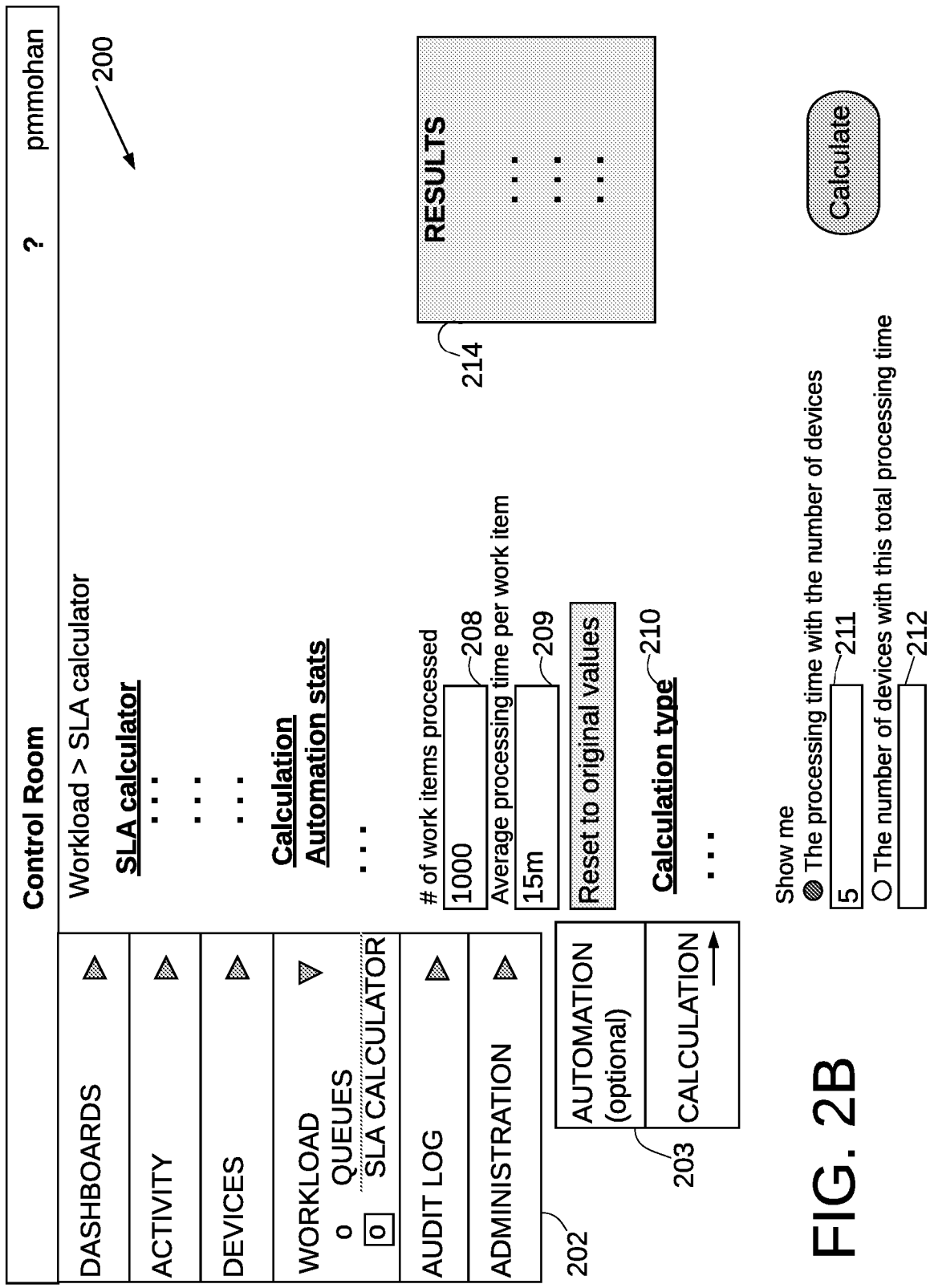
Figure 2C:
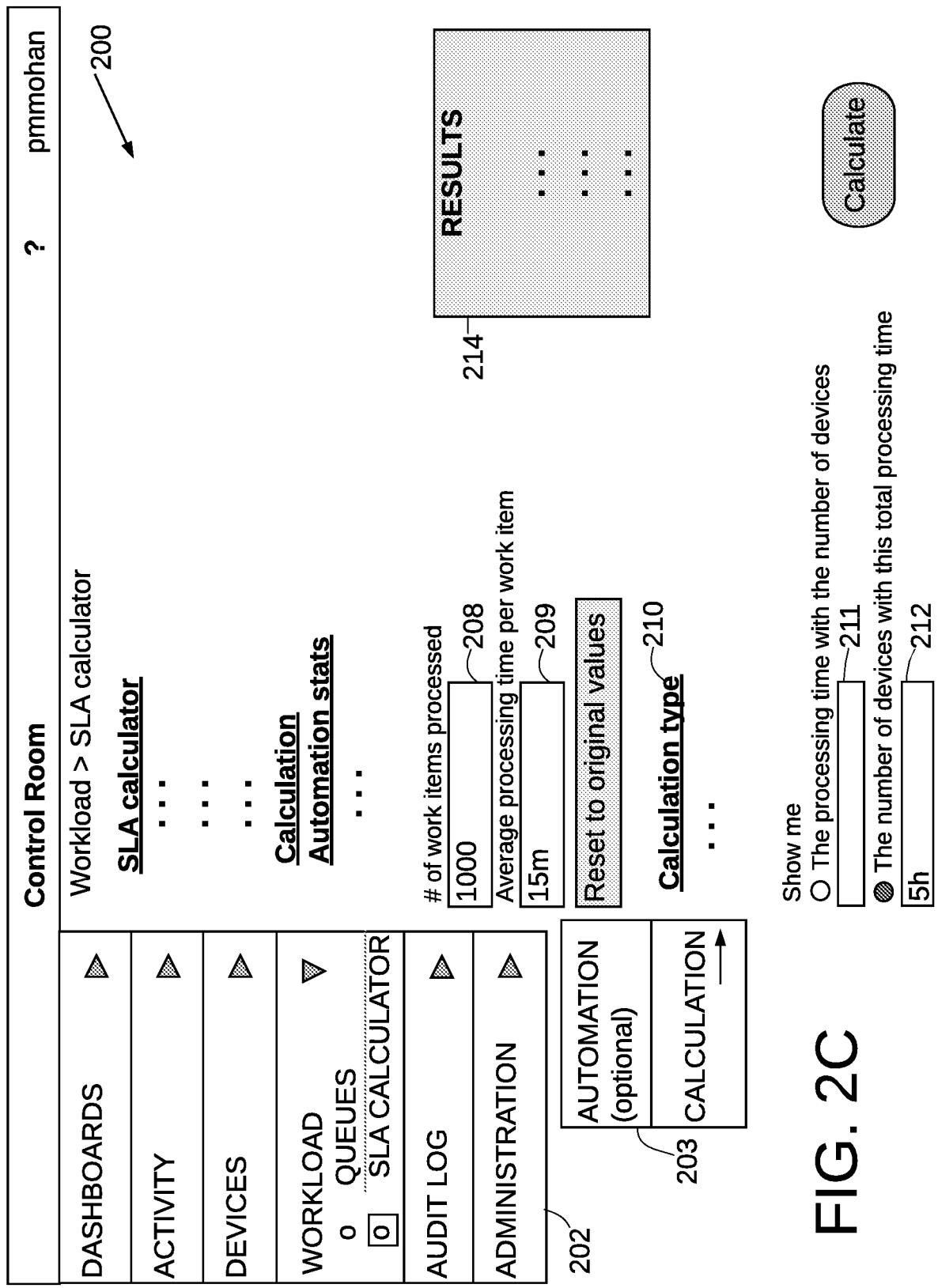

Control room module 104 includes an SLA generation automation module 112 which can be employed by user 102 in a manner shown in FIGS. 2A, 2B and 2C to determine an optimal manner in which to process work queues 106 with bot runners to meet various service level requirements. SLA generation automation module 112 provides recommendations on resource sizing of bot runner set (devices) 110. Each automation artifact 114, such as automation 1, automation 2, . . . automation n, is constructed with metadata describing a bot, queue 106 and bot runner set 110. Workload processor 116 may allocate automations by priority and/or by round robin allocation to the bot runner sets 110. Certain automations may be prioritized by user 102, and such automations will be deployed by workload processor 116 before lower priority automations. For example, some automations are required to be processed within for example, a 24-hour time period. Such automations may be prioritized over automations that are required to be processed in say 5 business days. Round robin allocation permits automations to be performed sequentially with the associated queue. For example, in a pure round robin allocation, automation 1 will be deployed by workload processor 116 to bot runner set 110 to work on a specific queue (Q1) it's configured with, followed by automation 2 to work on binded queue Q2 up to automation n, and then back to automation 1 to work on Q1. User 102 may at any time manually reorder any automation to meet any changed priorities, and user 102 may prioritize certain automations to take priority over other automations that are in a round robin allocation. Each bot runner is programmed to update control room 104 upon completion of its tasks and upon receiving such update, workload processor 116 updates its status entries in a manner described in further detail in conjunction with FIG. 3.

QoS module 107 implements a QoS protocol to provide high operational availability for incoming requests. The requests may come from bot runners, from users and administrators of the RPA system 10 via computerized user-interfaces, such as an application accessed via a web browser, and from bot creators.

Task prioritization module 118 permits prioritization of work items by one or more attributes of the work items. Queue orchestration module 120 permits simple orchestration of complex workflows by permitting user 102 to configure a bot to process a work item from one queue and push the outcome as a work Item into another queue.

FIGS. 2A, 2B and 2C illustrate a computerized interface 200 for entering and determining service levels for an RPA system 10. As seen, a selectable menu 202 is provided to user 102 to select among a variety of system administration options. In FIG. 2A, in menu 202, the WORKLOAD option is selected with the sub-option SLA CALCULATOR further selected. The interface 200 may provide the following text to the user 102: "Use the Service Level Agreement (SLA) calculator to assess: How long it will take to process items, based on device pool size, or How many devices you will need to meet a target SLA." The SLA CALCULATOR can be used to either determine how long it will take to process items (tasks in work queues 106), based on device pool 110 size or, how many devices will be required to meet a target service level agreement. The interface 200 also permits selection at 203 of an AUTOMATION status option, by way of entry or search of an automation name at 204 of a specific automation task that is being processed and can provide status of the automation task, including the time started and device on which the task was executed. The interface 200 may provide the following text to the user 102: "If you select an automation that has been active, we can prefill some data for you on the next page."

In FIG. 2B, the user 102 has selected at 203 the CALCULATION option to permit service level requirement inputs that specify RPA tasks to be performed and service level requirements in a variety of ways. As in FIG. 2A, the interface 200 may provide the following text to the user 102: "Use the Service Level Agreement (SLA) calculator to assess: How long it will take to process items, based on device pool size, or How many devices you will need to meet a target SLA." The interface 200 may also provide the following text to the user 102 under the label Automation stats: "if available, data is shown from the automation's processing over the past 90 days. Feel free to change these numbers to see different results." The module 104 provides, if available, data for fields 208 and 209, respectively, entry of a number of work items to be processed and entry of an average processing time per work item. This data is provided from automation tasks 114 processed over a recent period, such as the past 90 days. In certain embodiments, the data in field 209 may be more granular to reflect specifics of the computing resources being used. For example, one set of computing resources may be faster or slower than another set and this more accurate data of processing times may be employed. The data in fields 208 and 209 may also be changed by user 102 by manually entering an average processing time per work item. One of two calculation types 210 may be selected: processing time required with an entered number of computing devices 110, at 211, or number of devices required with an entered processing time, at 212. The interface 200 may provide the following text to the user 102: "Enter the device pool size, click Calculate and we will estimate total processing time. Or, give us a total processing time, click Calculate and we will estimate a device-pool size." Results of the data entered in FIG. 2B are shown at 214. The interface 200 may provide the following text to the user 102: "To meet your SLA of processing 1000 items at 15 minutes per item with 5 devices, you will need 2 days, and 2 hours." As seen, to meet the service level agreement of processing 1000 items at 15 minutes per item with 5 devices, the time required will be 2 days and 2 hours. User 102 may then use this information to either proceed with the processing and/or adjust expectations with departments within the organization as to processing times, or to obtain access to additional computing devices 110 to lower processing times.

In FIG. 2C, the calculation type at 212 of number of devices required is selected. As in FIGS. 2A and 2B, the interface 200 may provide the following text to the user 102: "Use the Service Level Agreement (SLA) calculator to assess: How long it will take to process items, based on device pool size, or How many devices you will need to meet a target SLA." As in FIG. 2B, the interface 200 may also provide the following text to the user 102 under the label Automation stats: "if available, data is shown from the automation's processing over the past 90 days. Feel free to change these numbers to see different results." As in FIG. 2B at 210, the interface 200 may provide the following text to the user 102: "Enter the device pool size, click Calculate and we will estimate total processing time. Or, give us a total processing time, click Calculate and we will estimate a device-pool size." At 214, the interface 200 may provide the following text to the user 102: "To meet your SLA of processing 1000 items at 15 minutes per item in 5 hours you will need 50 devices." As noted above in connection with FIG. 2B, user 102 may then use this information to either proceed with the processing and/or adjust expectations with departments within the organization as to processing times, or to obtain access to additional computing devices 110 to lower processing times.

FIG. 2D illustrates an embodiment of a user interface and functionality implemented by task prioritization module 118 by which user 102 may prioritize processing of work items. In FIG. 2D, as seen at 220 the user 102 has selected from selectable menu 229 a queue category of "Mortgage Data Template". The system provides an interface 230 that permits the user 102 to select the columns to be included for processing in each work item. As seen at 232, six columns are available to include for the Mortgage Data Template: Name, SSN (Social Security Number), Loan Amount, FICO Score, LTV (Loan To Value), and Submission Date. Each column has associated therewith a type, seen at 234. At 236, the user 102 is seen to have selected four columns to include for processing in each work item: Loan Amount, FICO Score, LTV, and Submission Date. In certain embodiments, the user may be limited as to the number of columns that may be selected. The selected columns at 230 may optionally be sorted by the user 102 in ascending or descending order by way of the interface at 238. When the system 10 is processing work items from the queue Mortgage Data Template, it will use the sort criteria specified at 238 to fetch the work items in that order. So, the mortgage loan applications will be processing in descending order of submission date, descending order of loan amount and ascending order of LTV.

Details of operation of queue orchestration module 120 are shown in the interface of FIG. 2E which shows an Insert Work Item command user interface 240 displaying a queue for which user 102 has a participant privilege. In the example shown in FIG. 2E, the user 102 is specifying the criteria under which work items processed in the Mortgage Data Template example of FIG. 2D are automatically further processed in the Approved Loan queue 242. Upon selection of the desired queue (in this case Approved Loan queue 242), the system displays the list of attributes and their data type under Name and Data Type columns shown at 244 and 246 respectively. The user 102 uses the system defined variable $WorkItem$ in the required command to access the work item attributes from the queue category. For example, the user 102 may wish to specify that workitems from the Mortgage Data Template that upon processing have a FICO Score greater than 700, and an LTV less than 80 are deemed to be approved and thereby automatically pushed to the Approved Loans queue 242 for further processing. In such a case the user 102 would enter the value 700 at 248 and a value of 80 at 249. The user 102 may also enter comparison operators (not shown) such as less than, greater than, equal to, or other variants.

Figure 3:
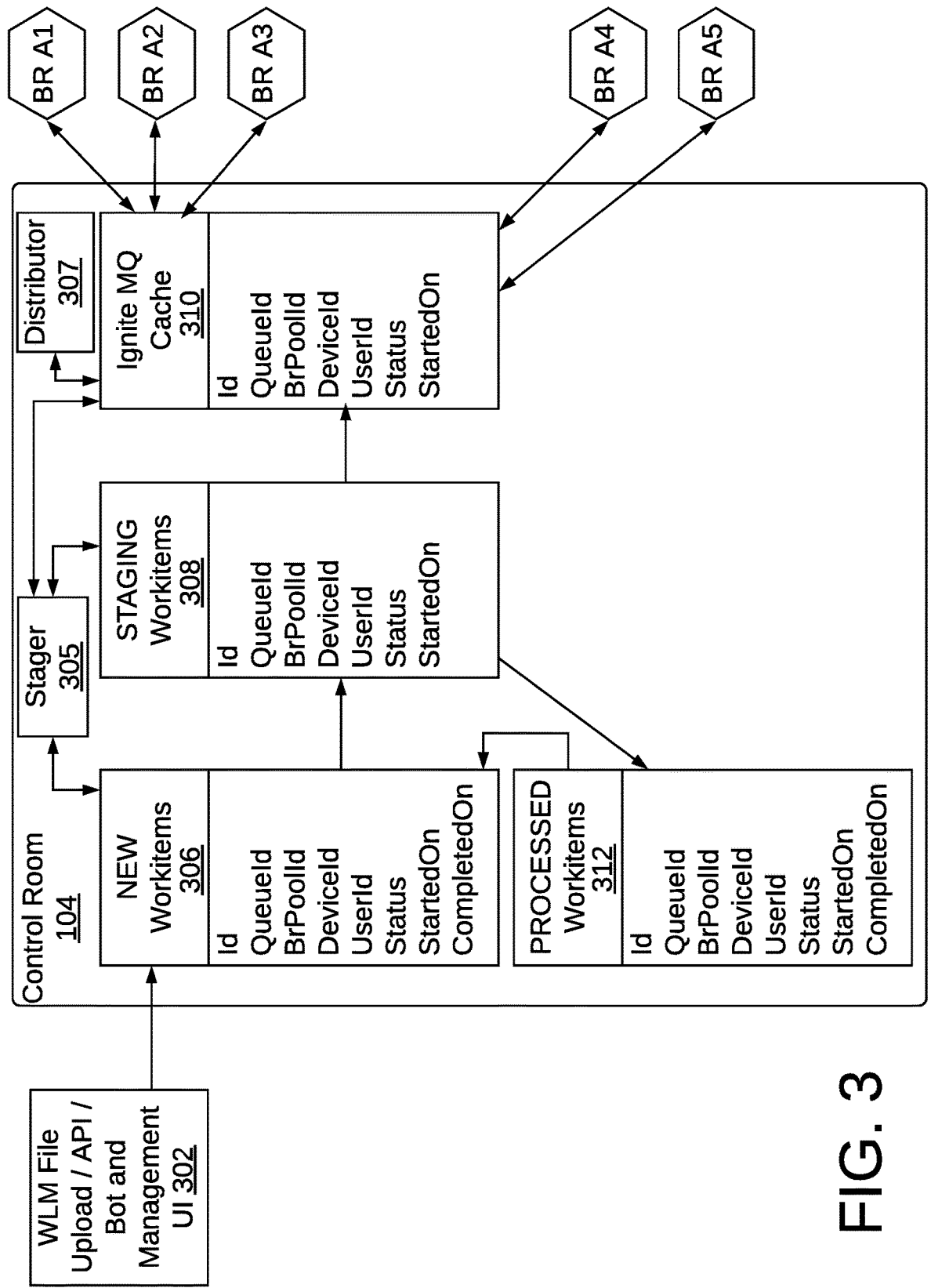
FIG. 3 is a database schema for an embodiment of an RPA system with SLA automation.

FIG. 3 illustrates further details of control room module 104 including an embodiment of a database schema employed in processing automation tasks 114. New workitems are received by control room module 104 from an input and management interface 302, via a WorkLoad Management (WLM) file, via an upload User Interface (UI), via an API, or via a bot that is processing a task. The control room 104 preferably employs a variety of tables to manage processing of automation tasks 114. New work items are received via UI 302 to NEW Workitems table 306. They are then staged to STAGING Workitems table 308 and then on to Ignite MQ Cache 310 for deployment to bot runners in the device pool 110.

Stager 305 moves New WorkItems 306 to Staging table 308 and Ignite MQ Cache table 310 which is preferably stored in high-speed, volatile storage. The distributor 307 distributes workitems from the Ignite MQ Cache 310 to BotRunners (devices) 110, based on round-robin or priority allocation. The stager 305 receives messages from the distributor 307 about which queues to fill and how many records to fill. The stager 305 operates irrespectively of whether round-robin or priority allocation has been selected. It merely receives a message from the distributor 307 about which queue (id) to fill in the Ignite 310 or staging 308 table. In round-robin allocation, the distributor 307 initially starts with the lowest Queue ID in the Pool, and then goes to next higher Queue ID (in that Pool) in a round robin manner.

Figure 4A:
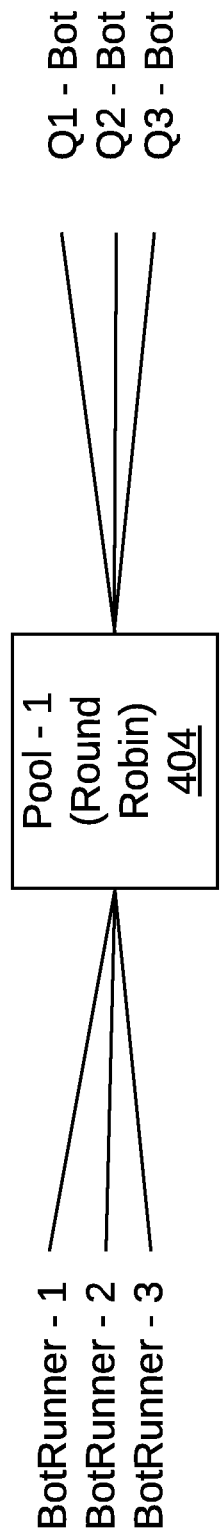
FIGS. 4A and 4B illustrate two approaches for allocating tasks in an embodiment of an RPA system with SLA automation.
Figure 4B:
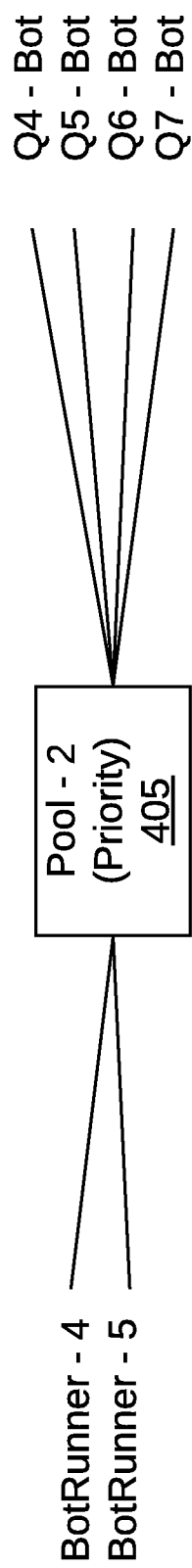

FIGS. 4A and 4B illustrate further details of the round robin and priority-based allocations implemented by the workload processor 116. FIG. 4A illustrates round robin-based allocation at 404 in which a pool of three bot runners (BotRunner −1, BotRunner −2, BotRunner −3) from device pool 110 is allocated for pool −1. The pool of three bot runners is provided within a time slice, automation workitem from Q1 and then upon expiration of the time slice, automation workitem from Q2, then from Q3 and then back to Q1. In certain embodiments, a default time-slice for the round robin allocation may be employed and may be changeable by an authorized user 102. Within a time-slice, all bot runners in at least a set, or all bot runners in the device pool 110 are allocated workitem from a particular queue.

Upon expiration of the time slice, all bot runners execute a context switch to switch to processing automation work item from the next queue in the round robin. While the distributor 307 is sending work items to bot runners from the "current" queue, it will send a message to the stager 305 to fill the "next" queue in advance. So usually the "current" and "next" queue (round-robin or priority based) will have some data. In priority allocation, the distributor 307 will start first with the automation and associated queue having the highest priority. Preferably the staging queue 308 and ignite queue 310 are both of variable, adjustable sizes with configurable low water marks to control when they are refilled with new work items. If work items in Ignite message queue fall below the low water mark, then the distributor 307 sends a message to the stager 305 with a Queue ID and number work items to add to the Ignite message Queue 310. Upon receiving the message, the stage 305 checks if the staging table 308 is below the water mark for that queue and adds more workitems to the staging queue 308 if required. When adding work items to the Ignite message queue 310, the stager 305 first updates those work items to status "QUEUED".

FIG. 4B illustrates priority-based allocation. Two bot runners (BotRunner −4, BotRunner −5) are allocated for pool −2. Automations associated with Q4 are prioritized the highest, then Q5, then Q6 and finally Q7 having the lowest priority. The work items in Q4 will be processed until the work items in Q4 are completed, then Q5 will be processed and so on.

Figure 5:
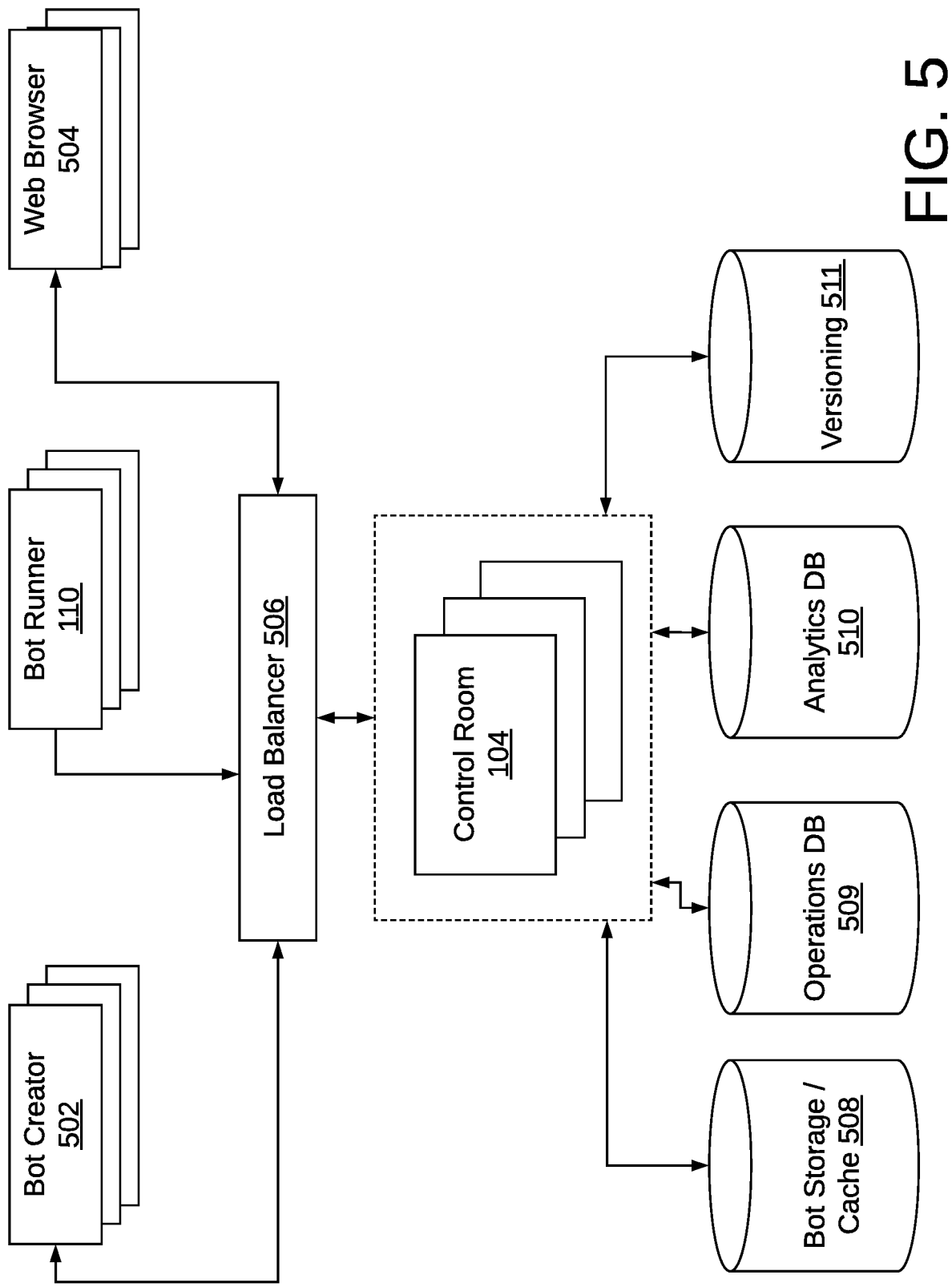
FIG. 5 is a high-level block diagram illustrating additional details of the RPA system of FIG. 1.

FIG. 5 is a high-level block diagram illustrating additional details of the RPA system of FIG. 1. Control room 104 advantageously implements a Quality of Service (QoS) protocol to provide high operational availability for incoming requests. The requests may come from bot runners 110 and also from bot creators 502 and from users and administrators of the RPA system 10 via, for example, web browsers 504. The control room 104 may comprise one or more servers which collectively implement a control room cluster that is used to manage, monitor and deploy bots. Each bot creator 502 takes form of a software programmed system used to author and upload bots for execution in the form of a bot runner 110. Each web browser 504 is used by a user or administrator to access control room 104. The requests from bot creators 502, bot runners 110 and web browsers 504 are processed by load balancer 506 which distributes the incoming requests between control room 104 cluster servers. The bot storage/cache 508 is used by the various control room 104 cluster servers to store or cache bots and configuration information. The operations database (DB) 509 is used by the control room 104 cluster servers as a primary database used to store all critical data related to Control Room operation including: bot, access control and analytics information. The analytics database (DB) 510 stores metadata related to analytics of the RPA system 10. The versioning database (DB) 511 may be employed for bot storage to facilitate versioning of bots.

The hardware employed by the various components of the RPA system 10 is preferably specified to certain minimum capabilities to enable proper response and functioning of the system. For example, each device 110 on which a bot runner will execute should be specified to have at least a certain processor and associated minimum transitory and non-transitory storage and be connected to the control room 104 via a network connection of certain minimum data transmission capability (eg. 1Gb or 10Gb Ethernet). Each bot creator 502, control room server 104, and the servers associated with the operations DB 509 and the analytics DB 510 will preferably have their own minimum processing, storage and data communication specifications.

Figure 6:
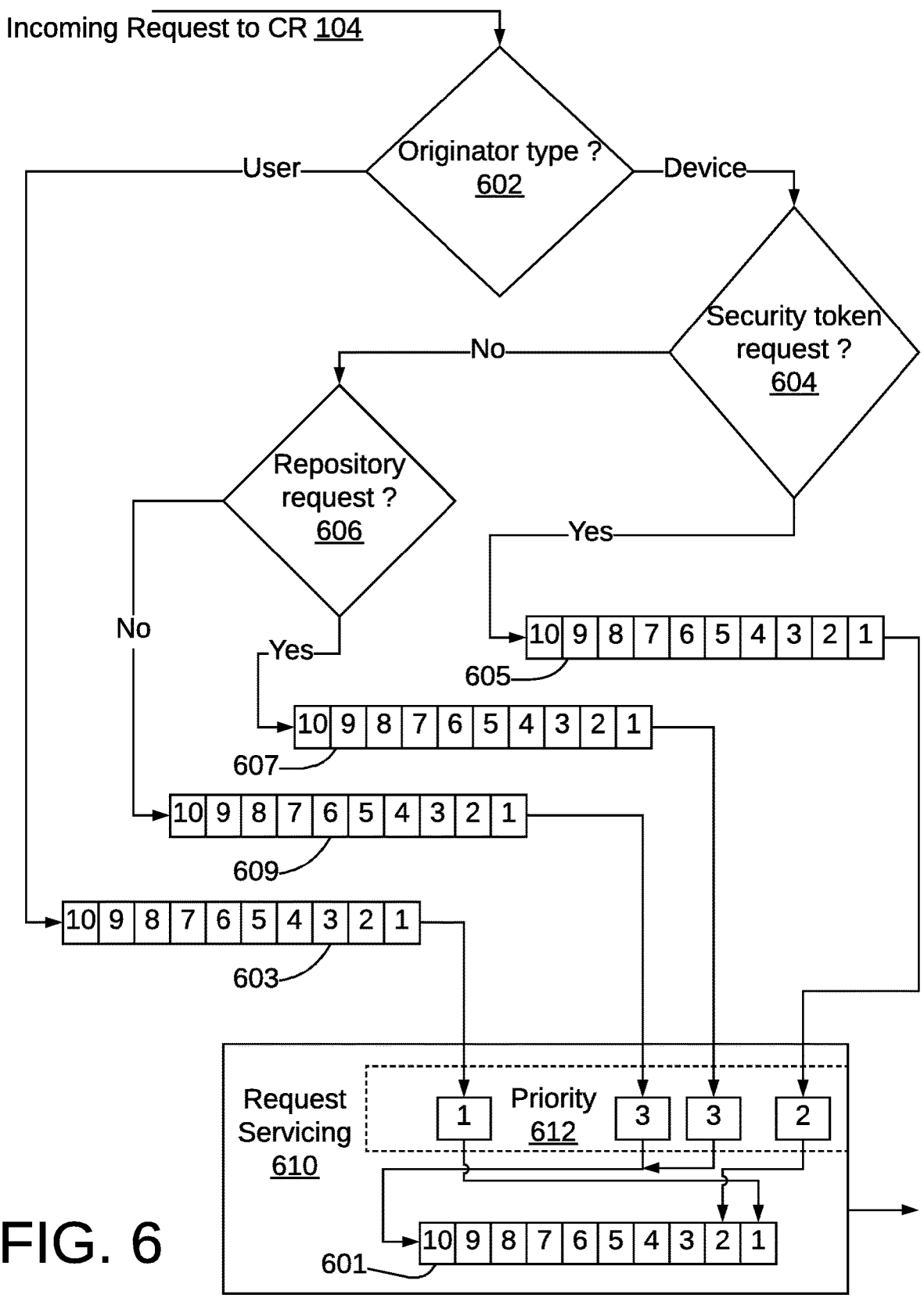
FIG. 6 is a flow diagram illustrating prioritization of requests.

Operation of the control room 104 is further shown in FIG. 6 which shows a flow diagram illustrating prioritization of requests from devices 110 such as bot creators 502 and bot runners 110, and users via web browsers 504 to generate a dynamic queue 601 of requests for servicing by control room 104. Each incoming control room request is examined at 602 to identify the originator type: device or individual user ("user"). Control requests that originate from a user, such as via browser 504, are treated with highest priority. This allows administrative functions, such as viewing the status of a device or disabling an automation, to be performed even when the control room 104 is fully utilized, thereby avoiding the need for a user to wait for system response. If it is determined at 602 that the request originated from a user the request is entered into user request queue 603, which operates on a First In, First Out (FIFO) basis. If the incoming request is determined to be a request from a device, a test is performed at 604 to determine if the request is from a device for a refresh of a security token employed by the device to access the various systems that it is programmed to interact with. If so, then the request is entered into security token request queue 605, which operates on a FIFO basis. If the device request is determined to not be a security token request at 604 then another test is performed at 606 to determine if the device request is for data from data repository 109. If so, the request is entered into repository request queue 607 which operates on a FIFO basis. If the device request is determined to not be a repository request at 606 then it is entered into "other" request queue 609. The contents of the queues 603, 605, 607 and 609 are prioritized at 612 to generate dynamic request queue 601. User requests from user request queue 603 are given highest priority and are placed ahead of already queued requests in queue 601 but behind any previously queued user requests. Security token requests from security token request queue 605 are given second highest priority and are placed in dynamic request queue 601 behind user requests and behind any previously queued security token requests. Requests for data from the repository request queue 607 are given third highest priority and are placed in dynamic request queue 601 behind security token requests and behind any previously queued repository requests. All other types of requests stored in other queue 609 are given lowest priority and are placed in dynamic request queue 601 behind repository requests and other previously queued other requests.

The queues 601, 603, 605, 607, and 609 are shown for simplicity of illustration with 10 positions. In practice the queues will typically have many more, positions, and this will often be a function of capabilities of the hardware. The various servers in the control room 104 will process each queued request in dynamic queue 601, with the result that multiple requests may be processed concurrently. In certain embodiments, to further enhance response of the control room 104 to user requests, the number of device requests in the queue 601 that may be processed concurrently by the control room servers 104 at any given time may be limited to an administrator adjustable quantity (e.g. 10).

Figure 7:
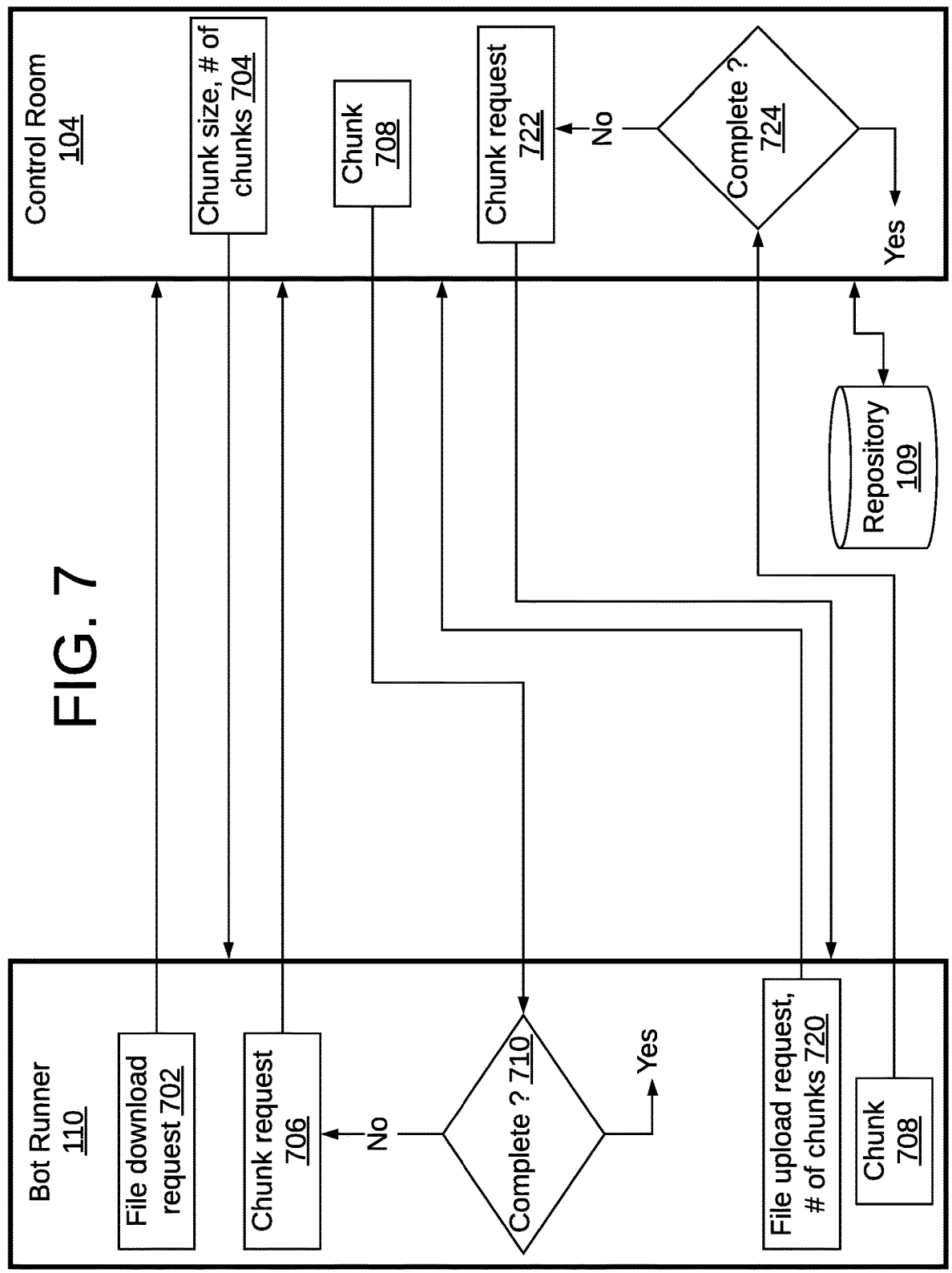
FIG. 7 is a flow diagram illustrating file download and upload requests.

FIG. 7 is a flow diagram illustrating file download and upload requests. The bot runners 110 and the control room 104 advantageously interact to implement a fair queuing strategy for download and uploads of data from and to the repository 109. To obtain a file for processing, a bot runner 110 sends a file download request 702 to the control room 104 when then accesses the file in the repository 109 to determine the file size. The control room 104 then divides at 704 the file into chunks, each chunk being a predetermined size, and transmits the chunk size and number of chunks to the requesting bot runner 110. The bot runner 110 initiates a download routine 706, 708, 710 to serially request a chunk from the control room 104 which causes transfer of the requested chunk from the repository 109. This routine is continued until all chunks of the requested file have been transferred from the control room 104 to the bot runner 110. The bot runner 110 preferably does not request another chunk from the control room 104 until transfer of the prior chunk requested has completed. In certain embodiments, the control room 104 queues up a request for a chunk for up to a predetermined amount of time (e.g. two minutes) before timing out a request, thereby maintaining the order of requests. When considering the control room 104 processing of requests from multiple bot runners 110 concurrently, the effect of these actions is to treat each bot runner 110 treated fairly as a particular bot runner 110 must receive, for example, chunk 1 before it starts to receive subsequent chunk 2.

Uploading of information from a bot runner 110 to control room 104 is shown at 720, 722, 724. To initiate an upload of information to the control room 104, a bot runner 110 transmits an upload message to the control room 104 along with a number of chunks, representing the file to be uploaded. The control room 104 responds by initiating an upload routine 722, 724 by serially requesting from the bot runner 110, chunks for upload until the upload is completed.

As the number of bot runners 110 simultaneously downloading and uploading information to and from the repository 109 increase, the time taken for the control room 104 to start processing a chunk request increases. Preferably, a device (bot creator 502 or bot runner 110) will wait for up to a predetermined amount of time (e.g. two minutes) for a response before timing out a request to upload or download. With a default limit of parallel processed repository requests and simultaneous deployment and execution selected for a number of devices (e.g. 1000 devices), the average time to queue and process a chunk can be managed to a predetermined amount of time.

In the event that network connectivity between devices and the control room 104 is slower than a predetermined reference configuration, or if control room processors are under-utilized during deployment, the number of parallel repository 109 requests can be increased for better throughput. If the processor speed of the control room is lower than the predetermined reference configuration or network speed is higher it may be necessary to lower the number of parallel repository requests allowed to avoid loss of availability due to excessive CPU utilization throughout deployment. If a loss of availability (e.g. user requests are not processed) occurs due to excess processor usage on the control room 104, or the operations database 509, during execution the default number of parallel processed requests can be adjusted down.

To prevent overload when concurrently executing a large number of devices, the processing by the control room 104 of status update messages from bot runners 110 may preferably rate limited (i.e. process a certain number of status update messages within a certain time period) on a per-control room server basis. Messages that are rate limited are preferably discarded as they are just progress messages. Other messages, such as bot start, bot stop, and bot error are preferably not rate limited. Additionally, the rate limit may preferably be adjusted dynamically based on the number of unprocessed status update messages. If reactive rate-limiting is activated the progress reported on an activity page provided to a control room 104 user will be updated at a lower frequency than normal.

Figure 8:
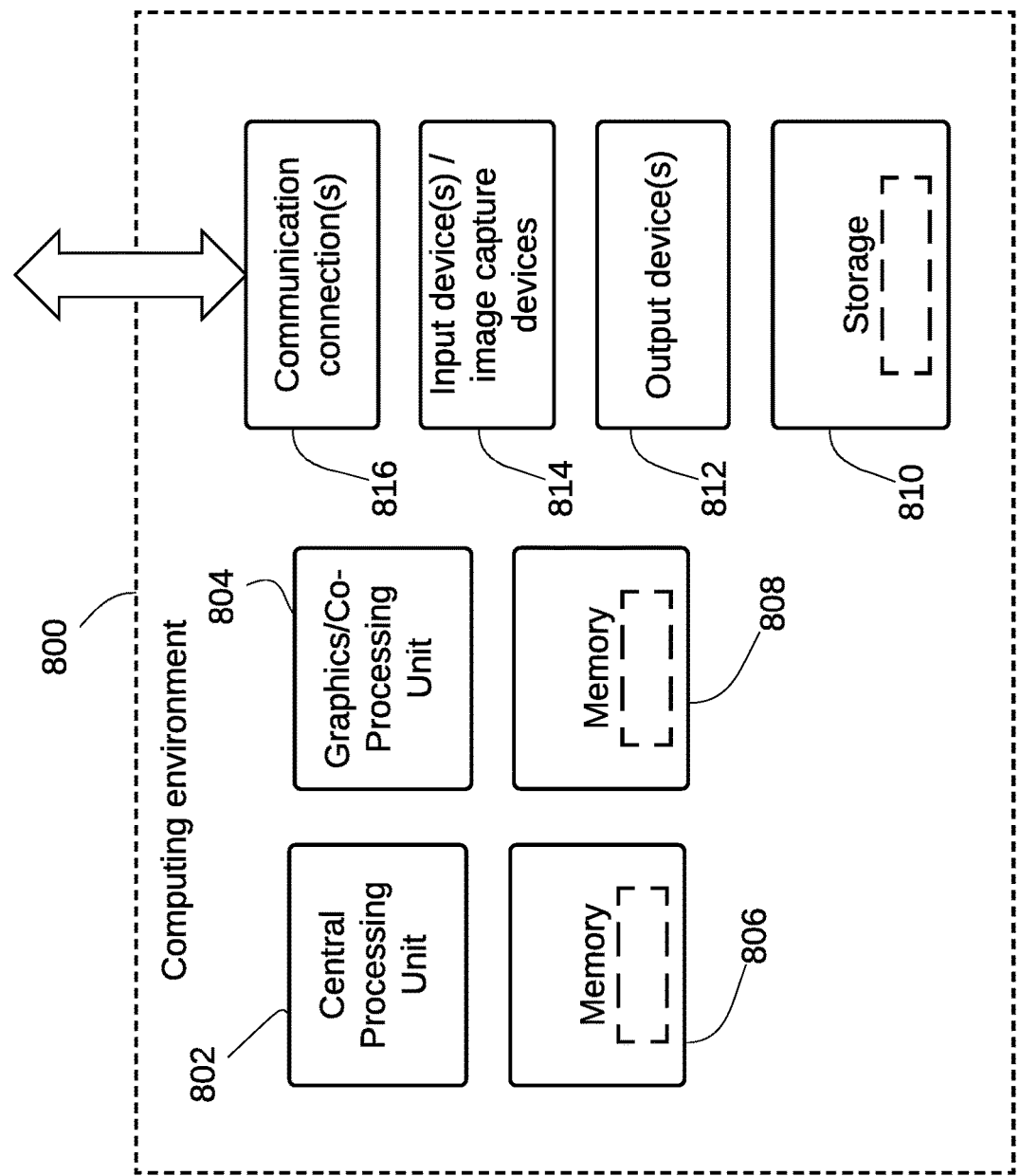
FIG. 8 illustrates a block diagram of hardware that may be employed in an implementation of the systems disclosed herein.

FIG. 8 illustrates a block diagram of hardware that may be employed in an implementation of the systems disclosed herein. FIG. 8 depicts a generalized example of a suitable general-purpose computing system 800 in which the described innovations may be implemented in order to improve the processing speed and efficiency with which the computing system 800 operates to perform the functions disclosed herein. With reference to FIG. 8 the computing system 800 includes one or more processing units 802, 804 and memory 806, 808. The processing units 802, 806 execute computer-executable instructions. A processing unit can be a general-purpose central processing unit (CPU), processor in an application-specific integrated circuit (ASIC) or any other type of processor. The tangible memory 806, 808 may be volatile memory (e.g., registers, cache, RAM), non-volatile memory (e.g., ROM, EEPROM, flash memory, etc.), or some combination of the two, accessible by the processing unit(s). The hardware components in FIG. 8 may be standard hardware components, or alternatively, some embodiments may employ specialized hardware components to further increase the operating efficiency and speed with which the system 10 operates.

Computing system 800 may have additional features such as for example, storage 810, one or more input devices 814, one or more output devices 812, and one or more communication connections 816. An interconnection mechanism (not shown) such as a bus, controller, or network interconnects the components of the computing system 800. Typically, operating system software (not shown) provides an operating system for other software executing in the computing system 800, and coordinates activities of the components of the computing system 800.

The tangible storage 810 may be removable or non-removable, and includes magnetic disks, magnetic tapes or cassettes, CD-ROMs, DVDs, or any other medium which can be used to store information in a non-transitory way and which can be accessed within the computing system 800. The storage 810 stores instructions for the software implementing one or more innovations described herein.

The input device(s) 814 may be a touch input device such as a keyboard, mouse, pen, or trackball, a voice input device, a scanning device, or another device that provides input to the computing system 800. For video encoding, the input device(s) 814 may be a camera, video card, TV tuner card, or similar device that accepts video input in analog or digital form, or a CD-ROM or CD-RW that reads video samples into the computing system 800. The output device(s) 812 may be a display, printer, speaker, CD-writer, or another device that provides output from the computing system 800.

The communication connection(s) 816 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "computing device" are used interchangeably herein. Unless the context clearly indicates otherwise, neither term implies any limitation on a type of computing system or computing device. In general, a computing system or computing device can be local or distributed and can include any combination of special-purpose hardware and/or general-purpose hardware with software implementing the functionality described herein. While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A robotic process automation system comprising:
   data storage for storing,
      a plurality of sets of task processing instructions, each set of task processing instructions comprising a plurality of task processing instructions operable to be executed at a user level by one or more user level application programs to execute a corresponding work item; and
      a plurality of sets of work items, each set of work items stored for subsequent execution by a corresponding device pool comprising a plurality of devices executing a corresponding set of task processing instructions, wherein each set of work items is a plurality of work items of a specific type characterized by a schema comprising a plurality of attributes, wherein each work item within a set of work items contains a value for each attribute in the schema corresponding to the set of work items to control execution of the work item, and wherein the device pools are provisioned and deployed by the robotic process automation system; and
   a processor operatively coupled to the data storage and configured to execute processor instructions that when executed cause the processor to:
      create a first queue for storing a first set of work items from the plurality of sets of work items based on one or more user inputs;
      assign the first set of work items from the data storage to the first queue based on one or more user inputs;
      identify as one or more prioritization attributes, one or more attributes within a first schema corresponding to the first set of work items based on one or more user inputs;
      prioritize execution of the first set of work items in the first queue that have a value of the identified one or more prioritization attributes corresponding to a user defined prioritization value or prioritization range based on one or more user inputs; and
      transmit, from the data storage, a first set of the task processing instructions corresponding to the first set of work items to a corresponding first device pool for execution, wherein the first device pool executes the first set of work items in the first queue by executing the transmitted first set of task processing instructions at a user level with one or more first user level application programs on the first device pool according to the identified one or more prioritization attribute values, and wherein the robotic process automation system recommends the size of the device pools and redeploys the first device pool with additional work items as the first device pool completes execution of the first set of work items.

2. The robotic process automation system of claim 1 wherein the processor instructions that when executed cause the processor to further prioritize execution of work items in the first queue that have a value of the one or more prioritization attributes that is greater than the user defined prioritization value.

3. The robotic process automation system of claim 1 wherein the processor instructions that when executed cause the processor to further prioritize execution of work items in the first queue that have a value of the one or more prioritization attributes that is within the prioritization range.

4. The robotic process automation system of claim 1 wherein the processor is further configured to execute processor instructions that when executed cause the processor to:
   receive device requests originating from one or more devices in the device pools, wherein each of the device pools is executing a corresponding set of task processing instructions from the plurality of sets of task processing instructions;
   receive requests from individual users performing one or more actions via corresponding computerized user interfaces pertaining to the robotic process automation system;
   identify the device requests and requests from the individual users; and
   prioritize execution of the requests submitted by the individual users over execution of the device requests.

5. The robotic process automation system of claim 4 wherein the processor is further configured to execute processor instructions that when executed cause the processor to prioritize execution of the requests submitted by the individual users over execution of device requests by:
   storing the requests submitted by the individual users to an individual user queue;
   storing the device requests to at least a first device queue; and
   transferring the requests from the individual user queue and the first device queue to a dynamic queue by assigning the requests from the individual user queue with higher priority for execution than requests from the first device queue.

6. The robotic process automation system of claim 5 wherein the processor is further configured to execute processor instructions that when executed cause the processor to:
   further identify device requests seeking a security token update; and
   prioritize execution of the device requests seeking a security token update over execution of other device requests.

7. The robotic process automation system of claim 6 wherein the processor is further configured to execute processor instructions that when executed cause the processor to:
   further identify device requests seeking to transfer files to or from the data storage; and
   prioritize execution of the device requests seeking to transfer files to or from the data storage behind execution of the device requests seeking a security token update, and over execution of other device requests.

8. The robotic process automation system of claim 7 wherein the processor is further configured to execute processor instructions that when executed cause the processor to prioritize execution of the device requests seeking to transfer files to or from the data storage behind execution of device requests seeking a security token update, and over execution of other device requests by:
storing the device requests seeking a security token update to a first device queue;
storing the device requests seeking to transfer information to or from the data storage to a second device queue;
storing the device requests seeking any service other than a security token update and to transfer information to or from the data storage to a third device queue; and
transferring requests from the first, second and third device queues to a dynamic queue by assigning requests from the first device queue with higher priority for execution than requests from the second and third device queues and assigning requests from the second device queue with higher priority for execution than requests from the third device queue.

9. The robotic process automation system of claim 8 wherein the processor instructions that cause the processor to further identify device requests seeking to transfer files to or from the data storage cause the processor to execute a device request seeking to download a file from the data storage by:
accessing the data storage to identify the size of the file sought to be downloaded, wherein the file is segmented for download into one or more chunks of predetermined size; and
transmitting the size of the file sought to be downloaded in the form of chunk size and number of chunks, to the device seeking to download the file information from the data storage, the device seeking to download the file from the data storage submitting one or more requests to transfer one at a time, a chunk of information from the data storage.

10. The robotic process automation system of claim 9 wherein the device seeking to download the file from the data storage awaits receipt of all data associated with a requested chunk of information before submitting a request for a subsequent chunk of information.

11. The robotic process automation system of claim 8 wherein the processor instructions that cause the processor to further identify device requests seeking to transfer files to or from the data storage cause the processor to execute a device request seeking to upload a file to the data storage by:
receiving from the device seeking to upload the file to the data storage an information upload request together with the size of the file to be uploaded, wherein the file to be uploaded is segmented for upload into one or more chunks of a predetermined size; and
submitting to the device seeking to upload the file to the data storage, one or more requests to transfer one at a time, a chunk of information for storage in the data storage.

12. A robotic process automation system comprising:
data storage for storing,
a plurality of sets of task processing instructions, each set of task processing instructions comprising a plurality of task processing instructions operable to be executed at a user level by one or more user level application programs to execute a corresponding work item; and
a plurality of sets of work items, each set of work items stored for subsequent execution by a corresponding device pool comprising a plurality of devices executing a corresponding set of task processing instructions, wherein each set of work items is a plurality of work items of a specific type characterized by a schema comprising a plurality of attributes, wherein each work item within a set of work items contains a value for each attribute in the schema corresponding to the set of work items to control execution of the work item, and wherein the device pools are provisioned and deployed by the robotic process automation system;
a processor operatively coupled to the data storage and configured to execute processor instructions that when executed cause the processor to:
create a first queue for storing a first set of work items from the plurality of sets of work items;
assign the first set of work items from the data storage to the first queue;
identify as one or more prioritization attributes, one or more attributes within a first schema corresponding to the first set of work items;
prioritize execution of the first set of work items in the first queue that have a value of the identified one or more prioritization attributes corresponding to a user defined prioritization value or prioritization range;
transmit, from the data storage, a first set of task processing instructions corresponding to the first set of work items to a corresponding first device pool for execution, wherein the first device pool executes the first set of work items in the first queue by executing the transmitted first set of task processing instructions at a user level with one or more first user level application programs on the first device pool according to the identified one or more prioritization attribute values, and wherein the robotic process automation system recommends the size of the device pools and redeploys the first device pool with additional work items as the first device pool completes execution of the corresponding first set of work items;
determine for each executed work item in the first set of executed work items that one or more variable values in the first schema corresponding to the first set of executed work items meet a first predetermined test, and then assign that executed work item that met the first predetermined test to a second set of work items;
assign the second set of work items to a corresponding second queue;
transmit, from the data storage, a second set of task processing instructions corresponding to the second set of work items to a corresponding second device pool for execution, wherein the second device pool executes the second set of work items in the second queue by executing the transmitted second set of task processing instructions at a user level with one or more second user level application programs on the second device pool.

13. The robotic process automation system of claim 12 wherein the processor is further configured to execute processor instructions that when executed cause the processor to:
determine for each work item in the second set of executed work items that one or more variable values in a second schema corresponding to the second set of executed work items meet a second predetermined test, and then assign that executed work item that met the second predetermined test to a third set of work items.

14. The robotic process automation system of claim 13 wherein the processor is further configured to execute processor instructions that when executed cause the processor to:
   create a third queue for processing the third set of work items based on one or more user inputs;
   assign one or more of the work items from the third set of work items to the third queue based on one or more user inputs;
   identify as one or more prioritization attributes, one or more attributes within a third schema corresponding to the third set of work items based on one or more user inputs;
   prioritize processing of work items in the third queue that have a value of the one or more prioritization attributes corresponding to a user defined prioritization value or prioritization range based on one or more user inputs; and
   transmit, from the data storage, a third set of task processing instructions corresponding to the third set of work items to a corresponding third device pool for execution, wherein the third device pool executes the third set of work items in the third queue by executing the transmitted third set of task processing instructions at a user level with one or more third user level application programs on the third device pool according to the identified one or more prioritization attribute values of the third schema.

15. The robotic process automation system of claim 12 wherein the processor is further configured to execute processor instructions that when executed cause the processor to:
   receive device requests originating from one or more devices in the device pools, wherein each device pool is executing a corresponding set of task processing instructions from the plurality of sets of task processing instructions;
   receive requests from individual users performing one or more actions pertaining to the robotic process automation system via corresponding computerized user interfaces;
   identify the device requests and requests from the individual users; and
   prioritize execution of the requests submitted by the individual users over execution of the device requests.

16. The robotic process automation system of claim 15 wherein the processor is further configured to execute processor instructions that when executed cause the processor to prioritize execution of the requests submitted by the individual users over execution of the device requests by:
   storing the requests submitted by the individual users to an individual user queue;
   storing the device requests to at least a first device queue; and
   transferring requests from the individual user queue and the first device queue to a dynamic queue by assigning requests from the individual user queue with higher priority for execution than requests from the first device queue.

17. The robotic process automation system of claim 16 wherein the processor is further configured to execute processor instructions that when executed cause the processor to:
   further identify device requests seeking a security token update; and
   prioritize execution of the device requests seeking a security token update over execution of other device requests.

18. The robotic process automation system of claim 17 wherein the processor is further configured to execute processor instructions that when executed cause the processor to:
   further identify device requests seeking to transfer files to or from the data storage; and
   prioritize execution of the device requests seeking to transfer files to or from the data storage behind execution of the device requests seeking a security token update, and over execution of other device requests.

19. The robotic process automation system of claim 12 wherein the processor is further configured to execute processor instructions that when executed cause the processor to prioritize execution of the device requests seeking to transfer files to or from the data storage behind execution of the device requests seeking a security token update, and over execution of the other device requests by:
   storing the device requests seeking a security token update to a first device queue;
   storing the device requests seeking to transfer information to or from the data storage to a second device queue;
   storing the device requests seeking any service other than a security token update and to transfer information to or from the data storage to a third device queue; and
   transferring requests from the first, second and third device queues to a dynamic queue by assigning the requests from the first device queue with a higher priority for execution than the requests from the second and third device queues and assigning the requests from the second device queue with a higher priority for execution than the requests from the third device queue.

20. The robotic process automation system of claim 19 wherein the processor instructions that cause the processor to further identify device requests seeking to transfer files to or from the data storage cause the processor to execute a device request seeking to download a file from the data storage by:
   accessing the data storage to identify the size of the file sought to be downloaded, wherein the file is segmented for download into one or more chunks of predetermined size; and
   transmitting the size of the file sought to be downloaded in the form of chunk size and number of chunks, to the device seeking to download the file information from the data storage, the device seeking to download the file from the data storage submitting one or more requests to transfer one at a time, a chunk of information from the data storage.

21. The robotic process automation system of claim 20 wherein the device pool seeking to download the file from the data storage awaits receipt of all data associated with a requested chunk of information before submitting a request for a subsequent chunk of information.

22. The robotic process automation system of claim 19 wherein the processor instructions that cause the processor to further identify device requests seeking to transfer files to or from the data storage cause the processor to execute a device request seeking to upload a file to the data storage by:
   receiving from the device seeking to upload the file to the data storage an information upload request together with the size of the file to be uploaded, wherein the file to be uploaded is segmented for upload into one or more chunks of a predetermined size; and submitting to the device seeking to upload the file to the data storage, one or more requests to transfer one at a time, a chunk of information for storage in the data storage.

\* \* \* \* \*